United States Patent
Scholl

(10) Patent No.: US 9,092,885 B2
(45) Date of Patent: Jul. 28, 2015

(54) METHOD OF PROCESSING A TEXT, GESTURE, FACIAL EXPRESSION, AND/OR BEHAVIOR DESCRIPTION COMPRISING A TEST OF THE AUTHORIZATION FOR USING CORRESPONDING PROFILES FOR SYNTHESIS

(75) Inventor: Holger Scholl, Geilenkirchen (DE)

(73) Assignee: Nuance Communications, Inc., Burlington, MA (US)

( * ) Notice: Subject to any disclaimer, the term of this patent is extended or adjusted under 35 U.S.C. 154(b) by 1193 days.

(21) Appl. No.: 10/479,555

(22) PCT Filed: Jun. 5, 2002

(86) PCT No.: PCT/IB02/02051
§ 371 (c)(1),
(2), (4) Date: Dec. 3, 2003

(87) PCT Pub. No.: WO02/099784
PCT Pub. Date: Dec. 12, 2002

(65) Prior Publication Data
US 2004/0148176 A1  Jul. 29, 2004

(30) Foreign Application Priority Data
Jun. 6, 2001  (DE) .................................. 101 27 558

(51) Int. Cl.
| | |
|---|---|
| *G10L 13/00* | (2006.01) |
| *G10L 25/00* | (2013.01) |
| *G10L 21/00* | (2013.01) |
| *H04L 9/32* | (2006.01) |
| *G06F 7/04* | (2006.01) |
| *G06T 13/00* | (2011.01) |
| *G10L 21/06* | (2013.01) |

(52) U.S. Cl.
CPC ................. *G06T 13/00* (2013.01); *G10L 21/06* (2013.01); *G06T 2213/12* (2013.01); *G10L 13/00* (2013.01)

(58) Field of Classification Search
CPC ..... G10L 13/00; G10L 13/027; G10L 13/043; G10L 13/08; G10L 2013/00; G10L 2015/00; G10L 2015/223; G10L 2015/225; G10L 2015/226; G10L 2015/227; G10L 2015/228; G10L 25/57; G10L 25/63; G10L 25/48; G10L 15/00265; G10L 15/22; G10L 15/25; G10L 15/24; G06K 9/00221; G06K 9/00; A63F 9/24; H04L 9/3226; H04L 9/32; H04L 9/3228; H04L 63/067; H04L 63/061
USPC ........... 704/260, 270, 275; 713/155, 168, 193
See application file for complete search history.

(56) References Cited

U.S. PATENT DOCUMENTS

| | | | | |
|---|---|---|---|---|
| 4,546,383 | A * | 10/1985 | Abramatic et al. ......... | 348/14.15 |
| 4,558,176 | A * | 12/1985 | Arnold et al. ................. | 713/190 |
| 4,841,575 | A * | 6/1989 | Welsh et al. .................. | 704/260 |
| 5,559,927 | A * | 9/1996 | Clynes .......................... | 704/258 |
| 5,657,426 | A * | 8/1997 | Waters et al. ................. | 704/276 |
| 5,878,396 | A * | 3/1999 | Henton ......................... | 704/276 |
| 5,880,731 | A * | 3/1999 | Liles et al. .................... | 715/758 |

(Continued)

*Primary Examiner* — Paras D Shah
(74) *Attorney, Agent, or Firm* — Wolf, Greenfield & Sacks, P.C.

(57) ABSTRACT

The invention relates to a method of processing a text, gesture, facial expression, and/or behavior description wherein the text, gesture, facial expression, and/or behavior description is synthesized by means of a speech, gesture, facial expression, and/or behavior profile, provided that an authorization code legitimizes the use of the speech, gesture, facial expression, and/or behavior profile for the synthesis.

10 Claims, 4 Drawing Sheets

(56) References Cited

U.S. PATENT DOCUMENTS

Figure 1:
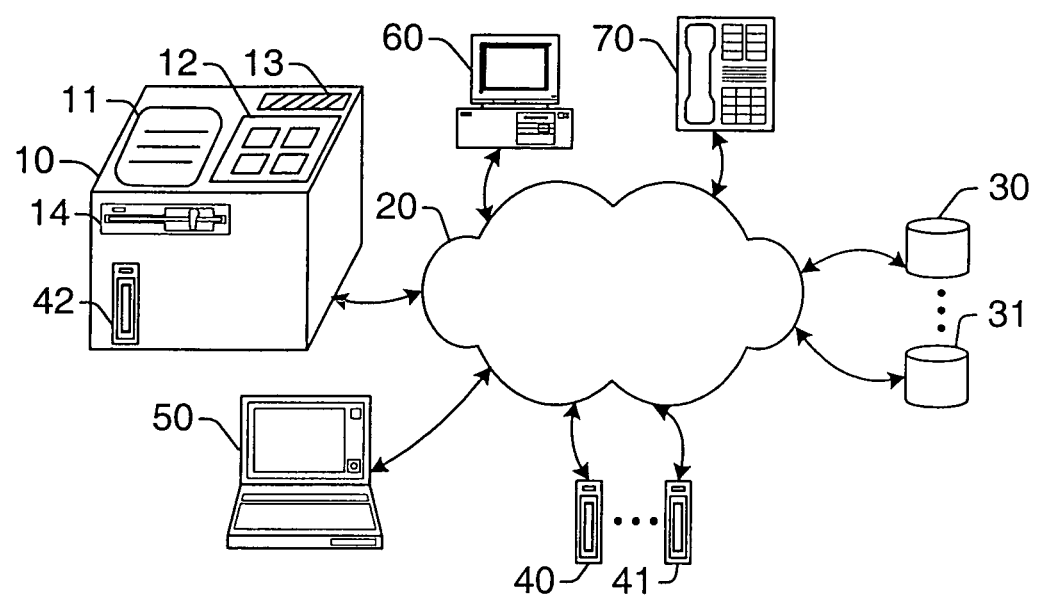

| | | | | |
|---|---|---|---|---|
| 5,892,900 | A * | 4/1999 | Ginter et al. | 726/26 |
| 5,918,222 | A * | 6/1999 | Fukui et al. | 1/1 |
| 5,923,337 | A * | 7/1999 | Yamamoto | 345/473 |
| 5,923,734 | A * | 7/1999 | Taskett | 379/114.18 |
| 5,949,882 | A * | 9/1999 | Angelo | 713/185 |
| 6,028,960 | A * | 2/2000 | Graf et al. | 382/203 |
| 6,029,195 | A * | 2/2000 | Herz | 725/116 |
| 6,035,273 | A | 3/2000 | Spies | 704/270 |
| 6,212,502 | B1 * | 4/2001 | Ball et al. | 704/270 |
| 6,285,380 | B1 * | 9/2001 | Perlin et al. | 345/473 |
| 6,343,361 | B1 * | 1/2002 | Nendell et al. | 713/171 |
| 6,384,829 | B1 * | 5/2002 | Prevost et al. | 345/473 |
| 6,434,525 | B1 * | 8/2002 | Nagisa et al. | 704/260 |
| 6,466,213 | B2 * | 10/2002 | Bickmore et al. | 345/473 |
| 6,526,395 | B1 * | 2/2003 | Morris | 706/20 |
| 6,539,354 | B1 * | 3/2003 | Sutton et al. | 704/260 |
| 6,804,396 | B2 * | 10/2004 | Higaki et al. | 382/181 |
| 6,813,607 | B1 * | 11/2004 | Faruquie et al. | 704/276 |
| 7,091,976 | B1 * | 8/2006 | Ostermann et al. | 345/473 |
| 7,277,855 | B1 * | 10/2007 | Acker et al. | 704/260 |
| 7,478,047 | B2 * | 1/2009 | Loyall et al. | 704/258 |
| 2003/0101137 | A1 * | 5/2003 | Wronski, Jr. | 705/44 |
| 2004/0255136 | A1 * | 12/2004 | Fadyushin | 713/193 |

* cited by examiner

METHOD OF PROCESSING A TEXT, GESTURE, FACIAL EXPRESSION, AND/OR BEHAVIOR DESCRIPTION COMPRISING A TEST OF THE AUTHORIZATION FOR USING CORRESPONDING PROFILES FOR SYNTHESIS

The invention relates to a method of processing a text description and is of importance for the technical field of text and speech synthesis. By analogy, however, the invention also relates to a method of processing a gesture, facial expression, and/or behavior description and is accordingly also of importance for the synthesis of image information.

Speech synthesis systems, i.e. systems for converting written text into spoken language, play a part in many applications. Examples are telephonic information or transaction systems in which system replies arranged in text form are to be read out first to a user. Concrete examples are systems for timetable or stock exchange share price information and for buying tickets or shares. Further applications are found in the so-termed "unified messaging" systems which serve to render possible the access to documents via several media such as, for example, the PC, telephone, picture telephone, and fax machine. Here, too, documents available in written form must be read to a user accessing through the telephone.

The flexibility in particular of automatic dialogue systems, such as the telephonic information or transaction systems, can be further enhanced beyond the speech synthesis in that a text synthesis is connected upstream of the speech synthesis systems. In this case, the information to be provided by the system is initially available only in the form of purely semantic information units, which are subsequently converted into a text by the text synthesis system through a concrete choice of the speaking style, for example elaborate or restricted, in many or few words, of the vocabulary, and/or of other characteristics such as, for example, the level of politeness and/or special characteristics of the application.

Thus, for example, a telephone information system may first react to a user request by retrieving from a database the information (German example) "place: Munich, prefix: 089, Christian name: Susanne, family name: Meyer, sex: female, telephone number: 45446538" and make these data available to the text synthesis system. This system may then form therefrom, for example, the sentence: "The telephone number of Mrs. Susanne Meyer requested by you is 45, 44, 65, 38. The prefix is Munich, 089."

Such a subdivision of the work among the respective semantic components of an automatic dialogue system, the text synthesis, and the speech synthesis considerably enhances the flexibility of the system design and the system maintenance if changes become necessary later, and is accordingly widely used in practical systems. This separation thus renders it possible, for example, to transfer such a system much more easily to a new language, because such a transfer does not affect, for example, the semantic components.

To achieve compact formulations, the basic information made available as input data for the text and speech synthesis is denoted text description, and the concept of speech synthesis is extended in the sense that it also comprises the step denoted text synthesis above. Accordingly, the expression "language profile" embraces the totality of the further information sources used for the synthesis by the speech synthesis systems, such as, for example, the elements mentioned above of speech style, choice of words, level of politeness, and application characteristics. Depending on the embodiment, however, the text description may comprise not only purely semantic information but also indications, for example, as regards text synthesis. In an extreme case the text description may thus already indicate, for example, the text itself, in which case the language profile essentially comprises no more than the intonation and the voice used for the speech synthesis. The concepts of text description and language profile should accordingly comprise all these possible embodiments in the present context.

Besides the speech synthesis of text descriptions, an image synthesis relating to gestures and/or facial expressions is also possible. Thus it is useful, for example, to reduce the quantity of data to be transmitted in the case of picture telephony in that the images are transmitted in a strongly compressed form. High compression rates can be achieved here through the use of image recognition at the transmitting side and image synthesis at the receiving side, because merely an image description is to be transmitted. It is necessary here, by analogy to the speech synthesis, that gesture and facial expression profiles are present at the receiving side, analogous to the speech profile, the characteristics of which are used for the synthesis. The facial traits and body contours of a certain person may then form part of such a gesture and facial expression profile. The profiles, however, may also comprise further characteristics of the person as regards gestures and facial expression, such as, for example, the manner in which this person smiles and carries out a certain hand movement. The synthesis methods then attempt, for example, to bring the synthesized speech, gestures, and facial expressions as close as possible to the real expressions of this person.

In a further step, behavior can be synthesized in addition to speech, gestures, and facial expressions. An example of behavior is the problem solving strategy of a person or a system, i.e., for example, the way in which a railway information system asks for the data required for giving information relating to starting point, destination, and time of the desired connection. Behavior thus typically extends over a longer time space of the interaction between a system and a user. It can be synthesized from a behavior description by means of a behavior profile in the same way as language, gestures, and facial expressions.

The text, gesture, facial expression, and/or behavior descriptions required for a synthesis may be put in directly or may be obtained through a recognition process from speech and/or picture signals. Furthermore, it is also conceivable to generate automatically a fitting gesture and/or facial expression description for a text description which is available. In the case of questions, for example, the eyebrows could be raised, and the index finger could be raised in the case of exclamations. Suitable gesture and/or facial expression indications could also be integrated in the text description, if so desired also in combination with control indicators for the speech synthesis. Inversely, suitable texts could be generated so as to fit certain gesture and/or facial expression events. A surprised facial expression might thus generate the exclamation "oh!". It is furthermore obvious that there are close relationships also between behavior, speech, gestures, and facial expressions.

A cooperative behavior is thus typically accompanied, for example, by polite formulations, friendly gestures, and a smiling face.

These examples show that text, gesture, facial expression, and/or behavior descriptions can be synthesized by means of speech, gesture, facial expression, and/or behavior profiles in many ways, for example, a text description may thus be utilized both for a speech synthesis and for a gesture and/or facial expression synthesis.

Whose speech, gesture, facial expression, and/or behavior profile is used for such a synthesis may depend on the nature and purpose of the description to be synthesized. If, for example, a picture telephone connection is to be established between two participants, it will be normal practice that the text, gesture, facial expression, and behavior descriptions are synthesized at the receiving side by means of the profiles of the respective person at the transmitting side. A further conceivable application, however, is the transmission of acoustically and visually animated electronic greeting cards. For example, a sender could himself record a birthday song composed by himself for this purpose for one of his friends, but choose the profile of a famous singer for the performance of the song at his friend's end. At the receiving side, therefore, text, gesture, facial expression, and behavior descriptions of the sender could be converted into an audiovisual representation which shows the famous singer performing the text of the sender with the gestures, facial expressions, and behavior of the sender. The gestures, facial expressions, and behavior of the singer could alternatively be used as well for the presentation of the text of the sender, in dependence on the wishes of the sender or also of the recipient.

Artificially created profiles may be used as well as the profiles of real persons. It is thus usual, for example, in certain Internet applications to guide the user by means of artificial characters, so-called avatars. Such artificially created profiles may also be used for the synthesis of text, gesture, facial expression, and/or behavior descriptions.

U.S. Pat. No. 6,035,273 discloses a speech communication system which manages to operate with a low data transmission rate. To achieve this, the spoken utterances of the sender are supplied to a speech recognition system at the transmitting side and are converted into text in this manner (speech to text). The text is transmitted to the receiving side, which requires a low data rate of approximately 160 to 300 bits per second. At the receiving side, the text is speech-synthesized by means of the speech profile of the sender, i.e. it is converted into spoken language again (text to speech).

U.S. Pat. No. 6,035,273 mentions several possibilities for making the language profile of the sender available at the receiving side. Thus, for example, the sender may send his language profile along with the text. Alternatively, however, the language profile may be stored in a device which is connected to a network (remote CTD, incorporated into a switching system or other network element) and may be called up by the receiver via the network. Furthermore, the language profile may also be separately transmitted to the receiver, for example before the transmission of the text, instead of being sent along with the text (transmission of speech profiles between CTDs).

U.S. Pat. No. 6,035,273 does indeed disclose the use of speech recognition and subsequent speech synthesis by means of the language profile of the sender as an efficient transmission technique for speech communication, but it provides no protection mechanisms for the use of the language profile. There is a possibility, however, of misuse of such language profiles, in particular in connection with the application possibilities of the language profiles of famous personalities, which leads to an obvious demand for protection of language profiles for reasons of personal privacy alone. For example, a well known singer could be prepared to make his voice, gesture, facial expression, and behavior profiles available against payment only, and possibly also exclusively for the representation of selected text, gesture, facial expression, and/or behavior descriptions. The free availability of his voice, gesture, facial expression, and behavior profiles would accordingly open the door to a misuse of his artistic copyright. A similar argument holds for the protection of artificially created profiles, for example of avatars, whose development may have involved a considerable expenditure.

It is accordingly an object of the invention to provide a method of processing a text, gesture, facial expression, and/or behavior description of the kind mentioned in the opening paragraph which pays due regard to the interests of the owners of the speech, gesture, facial expression, and/or behavior profiles to be used for the speech, gesture, facial expression, and/or behavior synthesis, i.e. to their interests in a controlled use of their profiles.

This object is achieved on the one hand by means of a
method of processing a text, gesture, facial expression, and/or behavior description wherein the text, gesture, facial expression, and/or behavior description is synthesized by means of a speech, gesture, facial expression, and/or behavior profile, provided that an authorization code legitimizes the use of the speech, gesture, facial expression, and/or behavior profile for the synthesis, and on the other hand by means of a
system for processing a text, gesture, facial expression, and/or behavior description wherein the text, gesture, facial expression, and/or behavior description is synthesized by means of a speech, gesture, facial expression, and/or behavior profile, provided that an authorization code legitimizes the use of the speech, gesture, facial expression, and/or behavior profile for the synthesis.

The introduction of an authorization code into the method renders it possible to test whether a user of the method is authorized to use the speech, gesture, facial expression, and/ or behavior profile for the purpose of synthesis. The interests of the owner of the speech, gesture, facial expression, and/or behavior profiles to be used for the speech, gesture, facial expression, and/or behavior synthesis in a controlled use of said profiles are safeguarded thereby.

One embodiment relates to an embodiment of the method in which it is tested whether the authorization code legitimizes the use of the speech, gesture, facial expression, and/or behavior profile for the synthesis of an actually present text, gesture, facial expression, and/or behavior description. Another embodiment is an embodiment in which an authorization code may be used for the authorization of a given number of cases. This includes, for example, the case in which a user of the method has obtained an authorization code which allows him to use the speech, gesture, facial expression, and behavior profiles of a famous singer five times, or also the case in which the user is allowed to use these profiles only twice for the synthesis of a single text, gesture, facial expression, and/or behavior description characterized by the respective authorization code.

Another embodiments is an embodiment in which the authorization code is used in an encrypted form in the method. This may be used on the one hand as a security measure in the transmission of the authorization code via a network so as to prevent an unauthorized copying of the authorization code by third parties, or at least to render this copying more difficult. On the other hand, it gives rise to the possibility, for example, to safeguard the integrity of the interrelationship between authorization code and text, gesture, facial expression, and/or behavior description and speech, gesture, facial expression, and/or behavior profile in the case of an authorization code which, legitimizes only the synthesis of a concrete text, gesture, facial expression, and/or behavior description, i.e., for example, the use of the authorization code for a spurious text is prevented or at least rendered more difficult.

Figure 2:
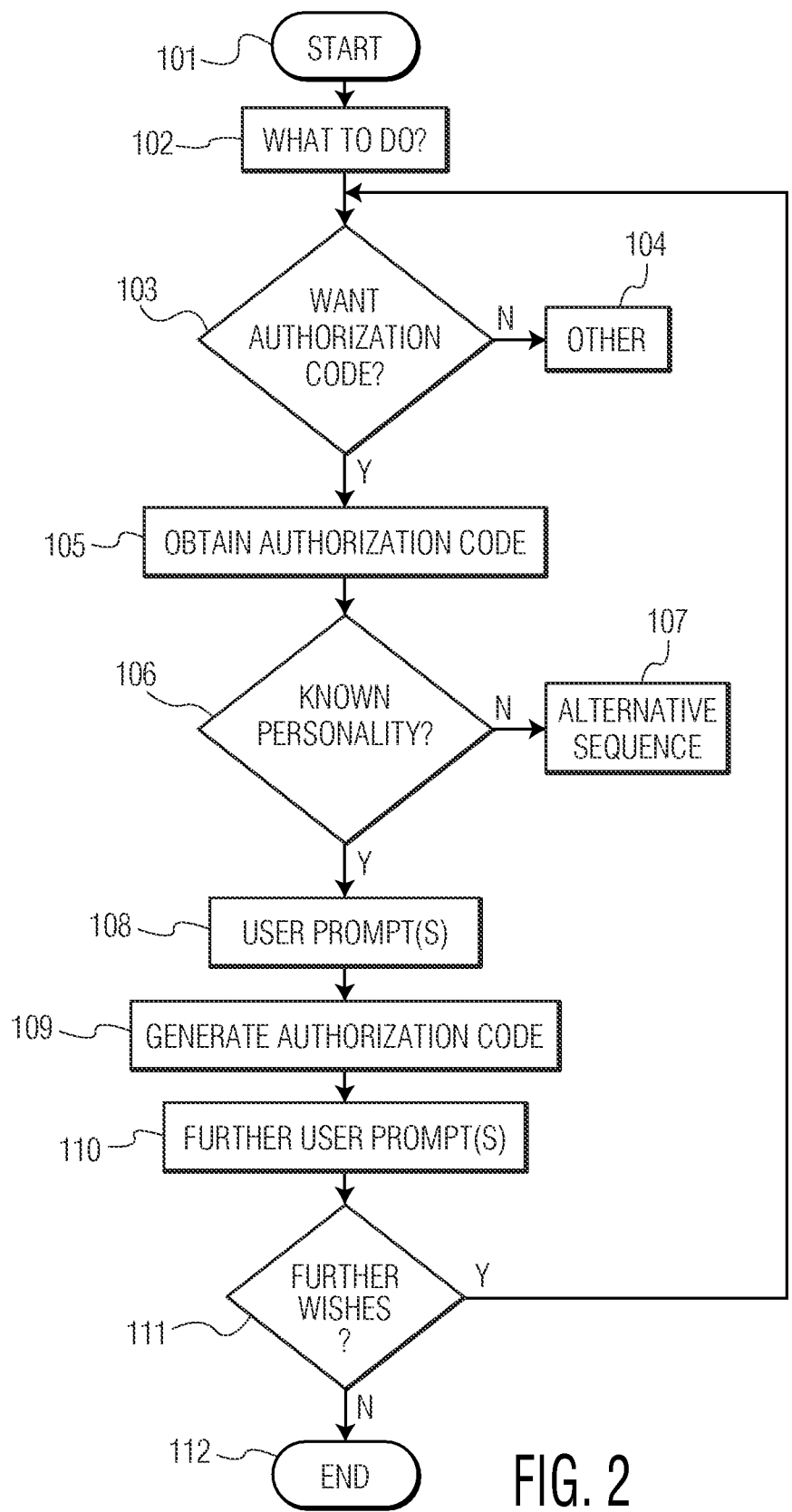
Figure 3:
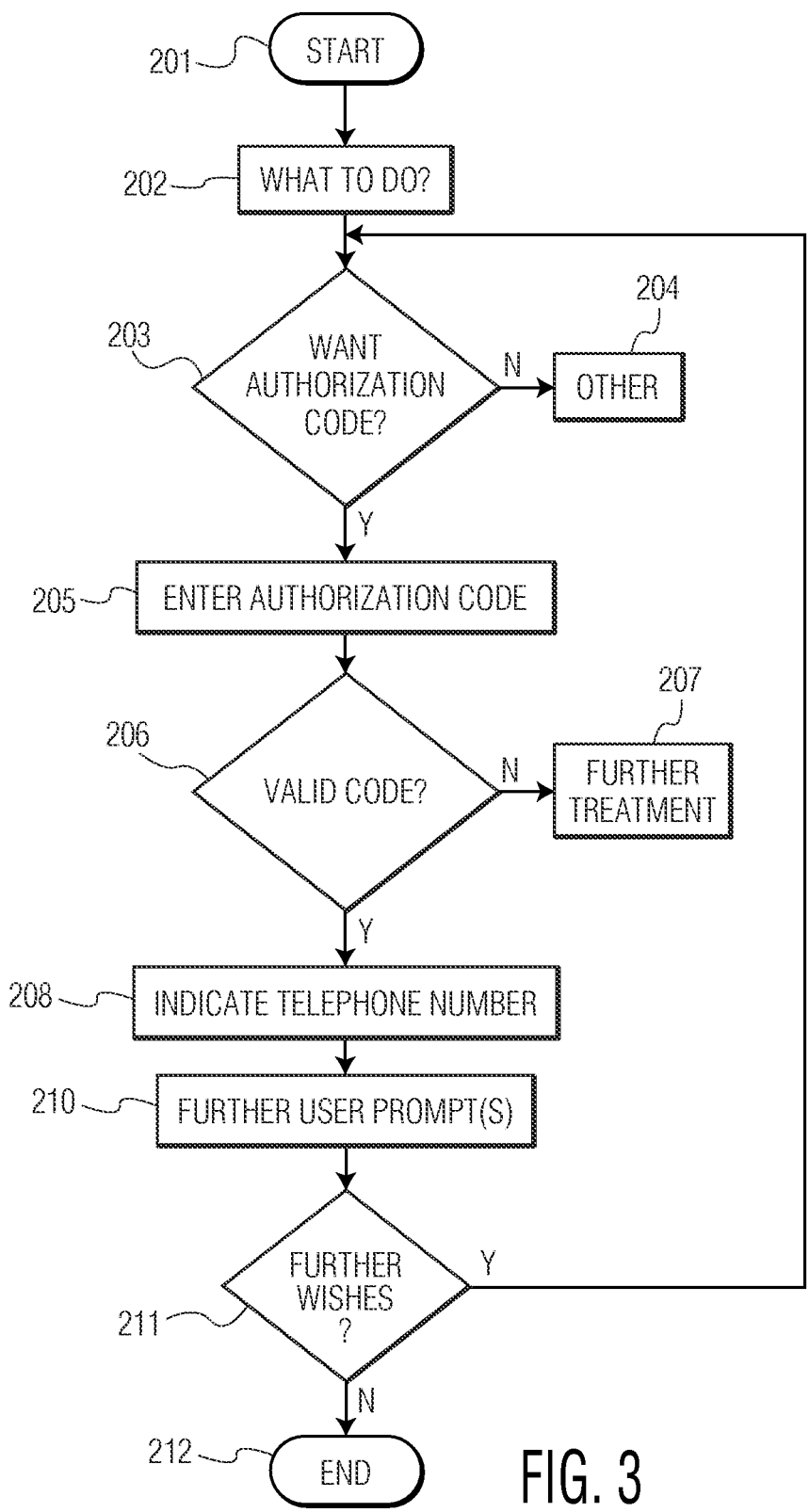
Figure 4A:
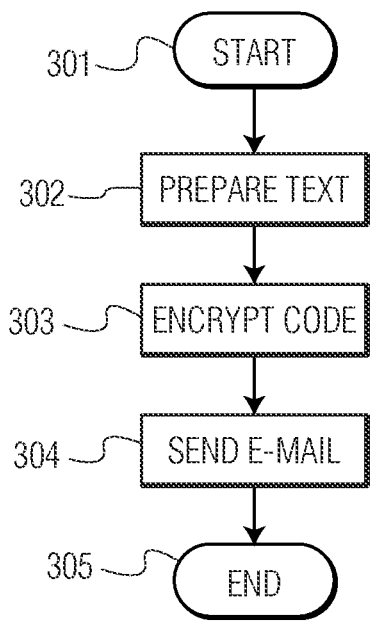
Figure 4B:
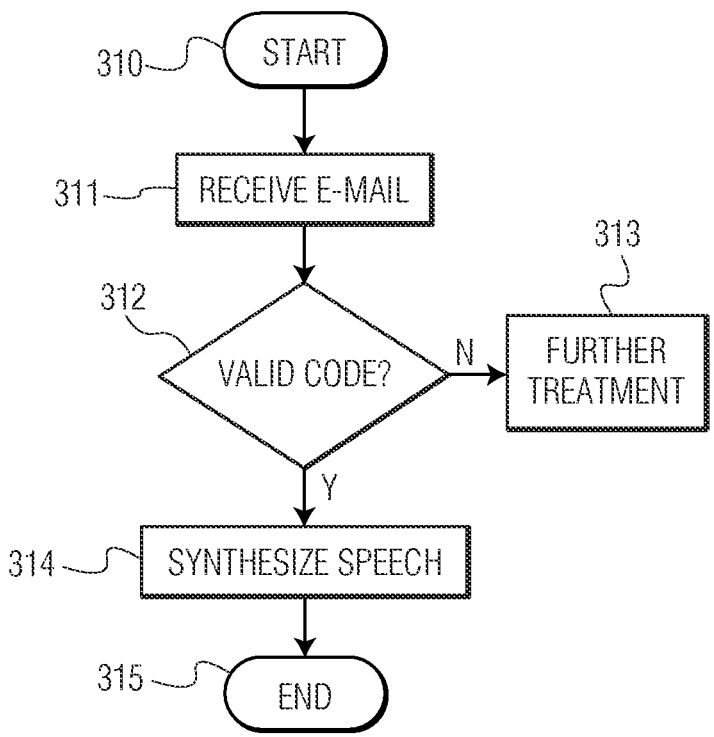

These and further aspects and advantages of the invention will be explained in more detail below with reference to the embodiments and in particular with reference to the appended drawings, in which:

FIG. 1 shows an embodiment of a system arrangement in which a method according to the invention for processing a text, gesture, facial expression, and/or behavior description can be implemented, FIG. 2 diagrammatically shows the sequence of steps for obtaining an authorization code for speech synthesis of a text by means of the language profile of a well known personality in the form of a flowchart, FIG. 3 diagrammatically shows the sequence of steps involved in the use of an authorization code for speech synthesis of a text by means of the language profile of a well known personality and the transmission of the synthesized text to a target telephone number in the form of a flowchart, and FIGS. 4a, 4b diagrammatically show the sequence of steps for creating, transmitting, receiving, and speech-synthesizing a text by means of the language profile of the author of the text in two flowcharts.

FIG. 1 shows an embodiment of a system arrangement in which a method according to the invention for processing a text, gesture, facial expression, and/or behavior description can be implemented. Various components are shown therein which offer various possibilities for using the method according to the invention. Said components may accordingly be all present collectively or only in part, depending on the individual embodiment.

The appliances shown in FIG. 1 are interconnected by means of wires or in a wireless manner via a network 20, for example the Internet or a telephone network. The interconnection may be present over a longer period, or it may be established temporarily only, as required, as is the case, for example, with a telephone conversation.

Four appliances are shown by means of which a user may be connected to the network 20: a public user terminal 10, a laptop 50, a PC 60, and a telephone 70. The public user terminal 10 has a display 11, a keyboard 12, a microphone/loudspeaker combination 13, an insertion slot 14 for a chip card, and a processing unit 42. Furthermore, processing units 40 . . . 41 and data memories 30 . . . 31 are connected to the network 20.

Possible utilization scenarios according to the invention of the system arrangement shown in FIG. 1 will now be described with reference to the flowcharts shown in the subsequent Figures.

FIG. 2 shows the sequence of obtaining an authorization code for speech synthesis of a text by means of the language profile of a well known personality in the form of a flowchart. In start block 101, a user makes contact with a system according to the invention for text processing. For this purpose, for example, he establishes a communication link to a processing unit 40 . . . 41 via the Internet 20 by typing a corresponding Internet address on his home computer 60. The processing unit 40 . . . 41 then asks him in block 102 what he wants to do.

The further control branches off after the decision block 103 depending on what the user wants. It is assumed here that the user wants to obtain an authorization code which allows him to synthesize a certain text into speech several times with the language profile of a well known personality XY. In this case, the control switches to block 105, in all other cases to a further block 104 not discussed here and dealing with the other user possibilities.

The processing unit 40 . . . 41 asks the user in block 105 to communicate the name of the envisaged well known personality. It is then tested in block 106 whether said personality is known to the processing unit 40 . . . 41. If this is not the case, an alternative sequence follows in block 107 which is not discussed further here. In the opposite case, the control switches from block 106 to block 108.

The user is now requested in that order in block 108 to enter the text and the number of times he wants to use the language profile of the well known personality, and also to pay the fee for the desired authorization code. This payment may take place, for example, through the input of a credit card number. If a public user terminal 10 is used instead of the PC 60, it may also be done through the insertion, for example, of a cash card into the slot 14 of the public user terminal 10. The text may be an own composition of the user, which is then transmitted to the processing unit 40 . . . 41 in block 108. Alternatively, it is conceivable that the user selects a text prepared in one of the data memories 30 . . . 31 in dialogue with the processing unit 40 . . . 41. In that case, for example, it may concern a generally known birthday song.

Subsequently, the processing unit 40 . . . 41 generates an authorization code for the desired application, in block 109, for example in the form of a unique random sequence of digits, stores it in one of the data memories 30 . . . 31, and communicates it to the user. If the text was communicated to the processing unit 40 . . . 41 by the user, this text may also be stored in one of the data memories 30 . . . 31. The necessary management data are also stored in one of the data memories 30 . . . 31, indicating the interrelationships between the authorization code, the text, and the language profile of the well known personality, and also specifying the number of times the authorization code may be used.

The user is finally asked for any further wishes in block 110. The user reply is evaluated in block 111. If the user has expressed further wishes, the control is passed back to block 103 again for further processing. If he has no further wishes, the interaction is terminated in end block 112.

FIG. 3 diagrammatically shows the sequence of utilization of an authorization code for speech synthesis of a text by means of the language profile of a well known personality and the transmission of the synthesized text to a telephone number, in the form of a flowchart. The blocks 201, 202, 203, and 204 correspond essentially to the blocks 101, 102, 103, and 104 of FIG. 2. It is assumed here, however, that the user wants to utilize an authorization code previously obtained, for example in accordance with the sequence of FIG. 2, so as to synthesize the text into speech by the language profile of the requested well known personality, whereupon it is sent to a telephone number of his choice. In order to contact one of the processing units 40 . . . 41, for example, he may use a laptop 50, a PC 60, or a telephone 70. Alternatively, however, he may use a public user terminal 10 and then communicate, for example, with the local processing unit 42 thereof, which unit may make contact with one of the processing units 40 . . . 41 via the network 20 whenever required.

In block 205, the processing unit 40 . . . 41, 42 asks the user to enter the authorization code. Depending on the system construction and application, a request may also be made for entering an unequivocal characterization of the well known personality and/or of the text. It is assumed here, however, that the authorization code was obtained in a scenario in accordance with FIG. 2 and belongs uniquely to a well known personality and a certain text, which interrelationship is stored in the system, for example in one of the data memories 30 . . . 31. Alternatively, the authorization code could characterize only the language profile and, for example, could allow the once-only synthesis of any text as desired which is shorter than a maximum length. In that case the text to be synthesized should obviously be made known to the processing unit 40 . . . 41, 42 at this point.

Block 206 tests the validity of the authorization code for the respective application. Depending on the application, this test involves the questions as to whether the authorization code belongs to the desired language profile, whether it belongs to the text to be synthesized, and whether the authorization code has not yet expired, i.e. whether it was not already utilized the envisaged maximum number of times.

If the authorization code is invalid, a further treatment of the interaction not discussed here takes place in block 207. In the opposite case, the processing unit 40 . . . 41, 42 requests the user in block 208 to indicate the telephone number to which the speech-synthesized text is to be sent. The synthesis of the text into speech also takes place in this block, as well as the selection of the telephone number and the reading of the speech-synthesized text to a recipient answering the relevant telephone number.

This block may in particular be embodied in a plurality of ways. For example, the processing unit 40 . . . 41, 42 may first connect the user with the recipient so that the user can ascertain whether the correct recipient has answered the telephone call and can announce to the latter that the processing unit 40 . . . 41, 42 will now read a message to him/her. The user may then obtain a connection to the processing unit 40 . . . 41, 42 again by pressing a special button, for example if a telephone 70 is used. Instead, the processing unit 40 . . . 41, 42 may itself read an introductory text to the participant. If no participant answers the telephone initially, the processing unit 40 . . . 41, 42 may make a fresh attempt to achieve a connection with the envisaged telephone number after a delay period. Alternatively, for example, the user may determine that the speech-synthesized text is sent as an audio attachment of an e-mail to an e-mail address in this case, which address should then obviously have to be communicated to the system.

After block 208, the further processing steps 210, 211, and 212 again essentially correspond to those of blocks 110, 111, and 112 of FIG. 2.

FIGS. 4a and 4b diagrammatically show the sequence of preparing, sending, receiving, and speech-synthesizing a text by means of the language profile of the author of the text in the form of two flowcharts.

FIG. 4a first shows the preparation and transmission of a text together with the language profile of the author of the text in the form of an e-mail. After the start in block 301, the text is prepared in block 302. An authorization code is subsequently generated in block 303, characterizing the text and the author's language profile. To generate such an authorization code, for example, the text and the language profile may be represented as a moving bit sequence which is subsequently imaged onto a number of manageable size by means of a hashing procedure. To assure the integrity of the interrelationship between text, language profile, and authorization code, the authorization code is additionally encrypted in block 303 in an asymmetrical encrypting process such as, for example, the RSA algorithm with the private key of the author of the text.

In block 304, the text is sent together with the language profile of the author, the encrypted authorization code, and a unique identifier of the author in the form of an e-mail. The process then ends in block 305.

FIG. 4b shows the reception and speech synthesis of the received text with the language profile of the author of the text. After the start block 310, an e-mail is first received in block 311 containing a text, the language profile of the author of the text, an encrypted authorization code, and a unique identifier of the author. Also in block 311, the text, language profile, encrypted authorization code, and author identifier are provided to a text processing system according to the invention.

This system tests in block 312 whether the authorization code is valid. For this purpose, the encrypted authorization code is deciphered with the open key of the author of the text. If this deciphering step is successful, and the deciphered authorization code corresponds to the hash value of the transmitted text and language profile in the hashing procedure mentioned above, the authorization code is valid. If the authorization code is invalid, a further treatment of the interaction with the receiver is carried out in block 313 which is not discussed any further here. In the opposite case, the text is synthesized into speech in block 314 by means of the language profile, and the synthesized text is given out as an audio signal, whereupon the interaction with the recipient is ended in block 315.

In FIGS. 4a and 4b, the authorization code encrypted with the private key of the author of the text in combination with the unique author identifier constitutes a signature which proves the authenticity of the text and the language profile and which is utilized by a text processing system according to the invention for testing the authorization of the use of the language profile for synthesizing the text into speech.

In a modification of this scenario, a author of the text may want to allow a general utilization of his language profile for synthesizing his texts into speech. In this case, it would suffice for the author of the text to make his language profile available for storage once and for all to a text processing system according to the invention which is used at the receiving side, and thus only to sign his texts and send them in accordance with the prior art. The text processing system according to the invention employed at the receiving side then uses the authenticity indicator of a text from the author provided by the signature for allowing the use of the language profile of the author for synthesizing the text in to speech.

The scenarios of use of a text processing system according to the invention presented in FIGS. 2, 3, 4a, and 4b are merely examples from among a plurality which comprises many further conceivable modifications. It is accordingly noted that a strongly decentralized architecture with components communicating via a network 20 was described with reference to FIGS. 2 and 3, whereas FIGS. 4a and 4b instead offer a local scenario in which all necessary actions take place locally at the transmitting or receiving side, and a network is merely used for the transmission of an e-mail. It is obvious that these architectures may be mixed, i.e. in the case of FIGS. 4a and 4b, for example, the language profile need not necessarily be transmitted along with the text if it is present in one of the data memories 30 . . . 31 instead, from where the receiving party can obtain it.

Furthermore, reference was made only to a text processing system for keeping the description of the Figures concise. It is obvious, however, that the invention is equally suitable for the processing of a text, gesture, facial expression, and/or behavior description. The invention may also be used in conjunction with language, gesture, facial expression, and/or behavior recognition systems which generate the text, gesture, facial expression, and/or behavior descriptions independently by means of a recognition process. Reference is also made once more to the possibilities noted above that text, gesture, facial expression, and/or behavior descriptions can be synthesized by means of speech, gesture, facial expression, and/or behavior profiles in a plurality of ways.

The invention claimed is:

1. A method carried out by a processor for processing text, hand gesture, facial expression, and behavior descriptions, wherein the processor is programmed to perform the method as a result of execution of program instructions, the method comprising acts of:

selecting, based on a first input from a user, a profile from a plurality of predetermined profiles, wherein each profile in the plurality of predetermined profiles is associated with a respective personality;

determining, based on a second input from the user, the text, hand gesture, facial expression, and behavior descriptions; and synthesizing speech and at least one moving image using both:

the text, hand gesture, facial expression, and behavior descriptions determined based on the second input from the user, and the profile selected based on the first input from the user, wherein the selected profile comprises information indicative of speech, hand gesture, facial expression, and behavior characteristics of the personality associated with the selected profile, provided that an authorization code received from the user legitimizes use of the selected profile for the act of synthesizing, wherein the authorization code is associated with the selected profile, and wherein at least one description selected from a group consisting of the text, hand gesture, facial expression, and behavior descriptions is obtained by performing a recognition process on one or more picture signals based on the second input from the user.

2. The method as claimed in claim 1, wherein the act of synthesizing is performed if a number of times for which the authorization code has already legitimized use of the selected profile for synthesis is smaller than a given first number.

3. The method as claimed in claim 1, wherein the authorization code is encrypted and is deciphered in the method, wherein an asymmetrical cryptography method is used for encrypting and deciphering.

4. The method as claimed in claim 1, wherein the act of synthesizing is performed if a number of times for which the authorization code has legitimized use of the selected profile for synthesis based on the text, hand gesture, facial expression, and behavior descriptions is smaller than a given second number.

5. A system for processing a text, hand gesture, facial expression, and behavior description, comprising:

a processing unit; and at least one memory storing executable instructions that when executed by the processing unit causes the processing unit to:

select, based on a first input from a user, a profile from a plurality of predetermined profiles, wherein each profile in the plurality of predetermined profiles is associated with a respective personality;

determine, based on a second input from the user, the text, hand gesture, facial expression, and behavior descriptions; and synthesize speech and at least one moving image using both:

the text, hand gesture, facial expression, and behavior descriptions determined based on the second input from the user, and the profile selected based on the first input from the user, wherein the selected profile comprises information indicative of speech, hand gesture, facial expression, and behavior characteristics of the personality associated with the selected profile, provided that an authorization code received from the user legitimizes use of the selected profile for the act of synthesizing, wherein the authorization code is associated with the selected profile, and wherein at least one description selected from a group consisting of the text, hand gesture, facial expression, and behavior descriptions is obtained by performing a recognition process on one or more picture signals based on the second input from the user.

6. The method as claimed in claim 1, wherein the act of synthesizing further comprises synthesizing text, and wherein the authorization code legitimizes synthesis of text that is shorter than a maximum text length.

7. The system as claimed in claim 5, wherein the processing unit is programmed to synthesize the speech and at least one moving image if a number of times for which the authorization code has already legitimized use of the selected profile for synthesis is smaller than a given first number.

8. The system as claimed in claim 5, wherein the processing unit is programmed to encrypt and decipher the authorization code, and wherein an asymmetrical cryptography method is used for encrypting and deciphering.

9. The system as claimed in claim 5, wherein the processing unit is further programmed to synthesize text, and wherein the authorization code legitimizes synthesis of text that is shorter than a maximum text length.

10. The system as claimed in claim 5, wherein the processing unit is programmed to synthesize the speech and at least one moving image if a number of times for which the authorization code has legitimized use of the selected profile for synthesis based on the text, hand gesture, facial expression, and behavior descriptions is smaller than a given second number.

* * * * *